United States Patent [19]

Scott et al.

[11] 4,397,973
[45] Aug. 9, 1983

[54] COMPOSITION COMPRISING AN AROMATIC POLYCARBONATE AND A SILOXY-OXYALKYLENE BLOCK COPOLYMER

[75] Inventors: Steven W. Scott, Evansville, Ind.; Howard A. Vaughn, Jr., Schenectady, N.Y.

[73] Assignee: General Electric Company, Mt. Vernon, Ind.

[21] Appl. No.: 291,124

[22] Filed: Aug. 7, 1981

Related U.S. Application Data

[63] Continuation of Ser. No. 865,293, Dec. 28, 1977, abandoned.

[51] Int. Cl.³ ............................................. C08L 69/00
[52] U.S. Cl. .................................... 524/114; 524/133; 524/135; 524/147; 524/151; 524/152; 524/153; 524/265; 524/611; 525/403; 525/409; 525/464
[58] Field of Search .................... 525/464, 403, 409; 524/265, 114, 133, 135, 147, 151, 152, 153, 611

[56] References Cited

U.S. PATENT DOCUMENTS

| | | | |
|---|---|---|---|
| 2,834,748 | 5/1958 | Bailey et al. | 260/42 |
| 2,999,835 | 9/1961 | Goldberg | 260/42 |
| 3,028,365 | 4/1962 | Schnell et al. | 260/47 |
| 3,087,908 | 4/1963 | Caird | 260/42 |
| 3,169,121 | 2/1965 | Goldberg | 260/47 |
| 3,305,520 | 2/1967 | Fritz et al. | 260/45.7 |
| 3,334,154 | 8/1967 | Kim | 260/860 |
| 3,632,440 | 1/1972 | Preston | 260/824 |
| 3,673,146 | 6/1972 | Factor | 260/37 |
| 3,729,440 | 4/1973 | Liberty | 260/45.7 P |

*Primary Examiner*—Wilbert J. Briggs, Sr.
*Attorney, Agent, or Firm*—Martin B. Barancik

[57] ABSTRACT

A composition comprising (a) an aromatic polycarbonate and (b) a minor amount of a oxyalkylene siloxane block copolymer, and, optionally, an organic phosphite or phosphonite and/or epoxy compound provide lower viscosity in the melt without producing brittle molded parts.

12 Claims, No Drawings

COMPOSITION COMPRISING AN AROMATIC POLYCARBONATE AND A SILOXY-OXYALKYLENE BLOCK COPOLYMER

This is a continuation, of application Ser. No. 865,293 filed Dec. 25, 1977, now abandoned.

This invention is concerned with a plasticized stabilized polycarbonate composition comprising in admixture an aromatic carbonate polymer and a minor amount of a oxyalkylene siloxane block copolymer and, optionally an organic phosphite or phosphonite and/or epoxy compound.

BACKGROUND OF THE INVENTION

Polycarbonate polymers are excellent molding materials because products made therefrom have high impact strength, toughness, high transparency, wide temperature limits (high impact resistance below $-60°$ C. and a UL thermal endurance rating of $115°$ C. with impact), good dimensional stability, high creep resistance and electrical properties which qualify it as sole support for current carrying parts.

Polycarbonates are, however, very difficult to fabricate from melts for the reason that melts thereof have exceptionally high viscosities. Attempts to overcome this difficulty by the incorporation with the polycarbonate of materials known to reduce the viscosity of other resins have very generally been unsuccessful. Many standard viscosity control agents appear to have little or no effect on the viscosity of polycarbonate. Other compounds known to lower the viscosity of resins cause degradation of polycarbonate resins. Some compounds, conventionally employed to improve the workability of polymers, produce an embrittling effect on polycarbonates when they are mixed therewith and the resin is subjected to elevated temperatures as in molding. Still other materials, while satisfactory stiffness modifying agents for other plastics, are too volatile to be incorporated with polycarbonates since polycarbonates have much higher melting points than many other thermoplastics. Furthermore, aromatic polycarbonates, especially in the form of pigmented compositions, e.g., containing $TiO_2$ and the like, are thermally unstable at high molding temperatures and tend to become yellow. It has been proposed to overcome these problems by adding polydiorganosiloxanes, see Caird, U.S. Pat. No. 3,087,908, or tiorganophosphites, e.g., U.S. Pat. No. 3,305,520, or mixtures of phosphonites and an epoxy compound, e.g., U.S. Pat. No. 3,729,440, or a phosphite, epoxy compound, ultramarine pigment and aryl siloxane fluid, see, e.g., U.S. Pat. No. 3,673,146, the disclosures of which are incorporated herein by reference.

It has now been surprisingly discovered that, by admixing a minor amount of a siloxane-oxyalkylene block copolymer with an aromatic carbonate polymer, and, optionally, an organic phosphite or phosphonite and/or epoxy compound, the resultant polycarbonate composition has reduced melt viscosity and does not become brittle or degraded upon molding and thus retains its characteristic high impact strength.

DESCRIPTION OF THE INVENTION

According to this invention, there are provided plasticized, stabilized polycarbonate compositions comprising in admixture (a) an aromatic carbonate polymer and (b) a minor amount of a siloxy-oxyalkylene block copolymer.

Preferred siloxy-oxyalkylene block copolymer components (b) are of the following formula:

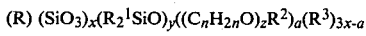

wherein R is a hydrocarbon radical having the valence of x, $R^1$ and $R^2$ are monovalent hydrocarbon radicals, $R^3$ is a member of the group consisting of alkyl radicals and $R_3Si-$ radicals, x is an integer having a value of at least 1, y is an integer having a value of at least 3, n is an integer having a value of 2 to 4, a is an integer having a value of at least 1 and not greater than 3x, and z is an integer having a value of at least 5, and mixtures thereof.

A preferred component (b) is of the formula:

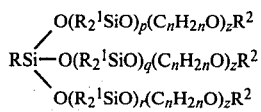

wherein $p+q+r=y$ as defined above and has a minimum value of 3, and R, $R^1$, $R^2$ and z are the same as in Formula I.

An especially preferred component (b) is of the formula:

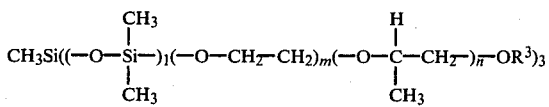

wherein $R^3$ is $C_1$-$C_6$ alkyl, l is 5 to 50, m is 10 to 30, and n is 0-35.

The amount of component (b) employed in the practice of this invention may vary from 0.3 to about 5.0 parts per one hundred parts of aromatic carbonate polymer (a). Preferably, these components (b) are employed in amounts of from 0.4 to about 1.0 parts per one hundred parts of aromatic carbonate polymer (a).

The siloxane-oxyalkylene block copolymer components (b) are prepared by methods as described in U.S. Pat. No. 2,834,748, which is incorporated herein by reference. As therein described, the compounds can be prepared by reacting a polyalkoxy polysiloxane having at least three alkoxy groups attached to a polysiloxane chain with a monohydroxyl polyoxyalkylene monoether by an exchange reaction wherein at least part of the alkoxy groups attached to the polysiloxane chain of the polyalkoxy polysiloxane are replaced by polyoxyalkylene mono-ether radicals and the alkoxy groups are removed as the corresponding alkanols.

The aromatic polycarbonates (a) that can be employed herein are homopolymers and copolymers and mixtures thereof which have an I.V. of 0.40 to 1.0 dl./g. as measured in methylene chloride at $25°$ C., and prepared by reacting a dihydric phenol with a carbonate precursor. Typical of some of the dihydric phenols that may be employed in the practice of this invention are bisphenol-A, (2,2-bis(4-hydroxyphenyl)propane, bis(4-hydroxylphenyl)methane, 2,2-bis(4-hydroxy-3-methylphenyl)propane, 4,4-bis(4-hydroxyphenyl)heptane, 2,2-(3,5,3',5',-tetrachloro-4,4'-dihydroxydiphenyl)propane, 2,2-(3,5,3',5'-tetrabromo-4,4'-dihydroxydiphenyl)propane (tetrabromobisphenol A), (3,3'-dichloro-4,4'-dihydroxydiphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glyciol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl)carbonates such as di-(chlorophenyl)carbonate, di-(bromophenyl)carbonate, di-(trichlorophenyl)carbonate, di-(tribromophenyl)carbonate, etc., di-(alkylphenyl)carbonates such as di(tolyl)carbonate, etc., di-(naphthyl)-carbonate, di-(chloronaphthyl)carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridien, triethylamine, dimethylaniline, tributylamine, etc. The inorgaic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as, for example, triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acids or their haloformyl derivatives.

Also included herein are blends of a linear polycarbonate and a branched polycarbonate.

Preferred aromatic polycarbonate components (a) are derived from bisphenol A; and from a mixture of bisphenol A and tetrabromobisphenol A.

Those embodiments of this invention which further include component (c), an organophosphite or organophosphonite co-stabilizer, can employ one or more compounds of the formulae:

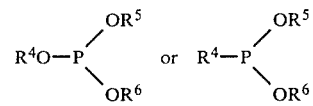

wherein $R^4$, $R^5$ and $R^6$ are independently selected from hydrogen, alkyl, aryl, cycloalkyl, aralkyl and alkylaryl radicals wherein at least one R is other than hydrogen. Preferably, the radicals have 1 to 20 carbon atoms. The alkyl may be methyl, ethyl, propyl, isopropyl, the various butyl isomers, e.g., butyl, sec-butyl, tert-butyl, the various amyl isomers, the various hexyl isomers, the various nonyl isomers, the various eicosyl isomers, etc.; the cycloalkyl may be cyclobutyl, cyclohexyl, 2-methylcyclohexyl, 4-methylcyclohexyl, 2-ethylcyclohexyl, 4-ethylcyclohexyl, 4-isopropylcyclohexyl, etc.; the aryl may be phenyl, 1-naphthyl, 2-naphthyl, biphenylyl, terphenylyl, etc.; the aralkyl may be any of the above alkyl substituted with one or more of the above aryl agroups, e.g., benzyl, phenylethyl, 1-phenylpropyl, etc.; and the alkaryl may be any of the above aryls substituted with one or more of the above alkyls, e.g., o-tolyl, xylyl, cumyl, mesityl, butylphenyl, nonylphenyl, etc. Typical of some of the phosphites that can be employed in the practice of this invention are diphenyldodecylphosphite, diphenylpentraerythritol phosphite, triphenylphosphite, di-(t-butylphenyl)octylphosphite, tris(nonylphenyl)phosphite, dipropylphenylphosphite, etc. The phosphonites includes phenyl diphenylphosphonite and diphenylpentaerythritol phosphonite. The preferred phosphites to be employed herein are triorgano phosphites, e.g., tris(p-nonylphenyl)phosphite, tridecylphosphite, etc., diaryl alkyl phosphites, e.g., diphenyldecylphosphite, etc.

The phosphites and phosphonites can be easily prepared, e.g., by reacting the corresponding carbinol with phosphorous trichloride, preferably in the presence of an acid acceptor, to produce the phosphite, or with the corresponding dichlorophosphine produce the phosphonite. These compounds are also commercially available, e.g., trinonylphenyl phosphite from Goodyear Co., under the name Polygard.

The amount of component (c) to be used can vary broadly, but preferably it will be in the range of from about 0.005 to about 1.0 parts by weight per 100 parts by weight of aromatic carbonate polymer (a), and preferably from about 0.05 to about 0.25 parts by weight.

The co-stabilizing epoxy compounds which can be employed as component (d) are selected from the following:

I. Derivatives of epoxy ethane represented by the following formula:

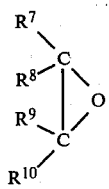

wherein $R^7$, $R^8$, $R^9$ and $R^{10}$ are independently selected from hydrogen, alkyl radicals of 1–24 carbon atoms, aryl of 6–24 carbon atoms, —CH$_2$OR$^{11}$, —CH$_2$OCOR$^{11}$, —CH$_2$OCOR$^{11}$X, —COOCH$_2$X, —CH$_2$OR$^{12}$OCH$_2$X, wherein $R^{11}$ is alkyl of 1–24 carbon atoms or aryl of 6 to 24 carbon atoms and wherein $R^{12}$ is alkylene of 1–24 carbon atoms and X is an oxirane ring.

II. Derivatives of epoxy cyclohexane represented by the following formula:

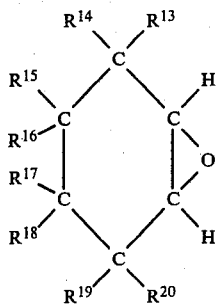

wherein $R^{13}$ through $R^{20}$ are independently selected from hydrogen, alkyl of 1–24 carbon atoms, —COOR$^{21}$, —OCOR$^{21}$, —COOR$^{22}$X, —OCOR$^{22}$—COOX wherein $R^{21}$ is alkyl of 1–24 carbon atoms and $R^{22}$ is alkylene of 1–24 carbon atoms and X is an oxirane ring.

While the actual number of hydrogen atoms employed may vary, it should be a function of the volatility of the epoxy compound. The number of hydrogen atoms should be such as to minimize the volatility of the epoxy compound since if the epoxy compound were to volatize at a low temperature, its benefit in use with a polycarbonate would be lost at the molding temperatures employed in preparing molded articles from the composition of this invention.

The amount of epoxy employed can vary from 0.01 to 0.5 weight percent based on the weight of the polymer composition and is preferably 0.03 to 0.3 weight percent. While more than 0.5 weight percent of epoxy can be employed, it has been found that higher amounts tend to degrade the physical properties of the polycarbonate and thereby reduce the usefulness of the polymer in providing tough, flexible molded articles.

Typical epoxy compounds are 3,4-epoxycyclohexylmethyl 3,4-epoxycyclohexane carboxylate, 3,4-epoxy-6-methylcyclohexylmethyl 3,4-epoxy-6-methylcyclohexane carboxylate, 2,3-epoxycyclohexylmethyl 3,4-epoxycyclohexane carboxylate, 4-(3,4-epoxy-4-methylcyclohexyl)butyl 3,4-epoxycyclohexane carboxylate, 3,4-epoxycyclohexylethyleneoxide cyclohexyl 3,4-epoxycyclohexane carboxylate, 3,4-epoxy-6-methylcyclohexylmethyl 6-methylcyclohexyl carboxylate, bisphenol-A diglycidyl ether, tetrabromobisphenol-A diglycidyl ether, di-glycidyl ester of phthalic acid, diglycidyl ester of hexahydrophthalic acid, epoxidized soybean oil, epoxidized linseed oil, bisepoxycyclohexyl adipate, butadiene diepoxide, tetraphenylethyleneepoxide, octyl epoxytallate and epoxidized polybutadiene. Also, 3,4-dimethyl-1,2-epoxycyclohexane, 3,5-dimethyl 1,2-epoxycyclohexane, 3-methyl-5-tert butyl-1,2-epoxycyclohexane, octadecyl 2,2-dimethyl-3,4-epoxycyclohexane carboxylate, cyclohexyl 2-methyl-3,4-epoxycyclohexane carboxylate, N-butyl 2-isopropyl-3,4-epoxy-5-methylcyclohexane carboxylate, octadecyl 3,4-epoxycyclohexane carboxylate, 2-ethylhexyl 3',4'-epoxycyclohexane carboxylate, 4,6-dimethyl 2,3-epoxycyclohexyl 3',4'-epoxycyclohexane carboxylate, diethyl 4,5-epoxy-cis-1,2-cyclohexane dicarboxylate, di-n-butyl 3-tert-butyl-4,5-epoxy-cis-1,2-cyclohexane dicarboxylate. Preferably, the epoxy compound is 3,4-epoxycyclohexylmethyl 3,4-epoxycyclohexane carboxylate.

As has been mentioned, pigmented polycarbonates are particularly difficult to stabilize. Among the pigments that are used can be mentioned fine particles of titanium dioxide, zinc oxide, zinc sulfide, basic lead carbonate, antimony oxide, zirconium oxide, potassium titanate, the so-called white (hiding pigments) and colored pigments, e.g., ultramarine blue, chromium oxide, and the like. The pigments are conventionally employed in amounts of about 0.001 to about 10 percent by weight. This invention is especially useful to protect pigmented polycarbonate compositions wherein the pigment is titanium dioxide. Titanium dioxide is generally used at levels of from about 1 to about 3 parts by weight per 100 parts by weight of aromatic carbonate resin.

The compositions of the instant invention may be prepared by blending the high molecular weight aromatic polycarbonate with the additive by conventional methods.

Obviously, other materials can also be employed with the aromatic carbonate polymer of this invention and include such materials as anti-static agents, mold release agents, pigments, thermal stabilizers, ultraviolet stabilizers, reinforcing fillers, such as glass and other inert fillers, foaming agents, and the like.

Description of the Preferred Embodiments

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified. In each of the Examples, the polycarbonate compositions have mixed therewith 0.1 weight percent of a mixture of 1 part diphenyloctyl phosphite and 2 parts 3,4-epoxycyclohexylmethyl-3,4-epoxycyclohexane carboxylate.

EXAMPLE 1

A polycarbonate composition of a homopolymer of 2,2-bis(4-hydroxyphenyl)propane, (hereinafter referred to as bisphenol-A) is prepared by reacting essentially equimolar amounts of bisphenol-A and phosgene in an organic medium with triethylamine, sodium hydroxide, and phenol, under standard conditions. This composition is then fed to an extruder, which extruder is operated at about 550° F., and the extrudate strands are chopped into pellets.

The pellets are then fed into a plastometer and the flow rate of the polymer is measured according to ASTM D1238-70, Condition 0. The melt flow rate is 17.16 g/10 min.

Additionally, the pellets are injection molded at about 315° C. into test specimens of about 5 by ½ by ⅛ inch thick. The unnotched Izod impact strength of these specimens is then measured according to the Izod test, ASTM D-256. The impact strength is 13.6 ft.lbs./in.

The procedure is repeated except that 0.2 weight percent of an alkoxy (polyalkylene oxide) siloxane additive of the average formula:

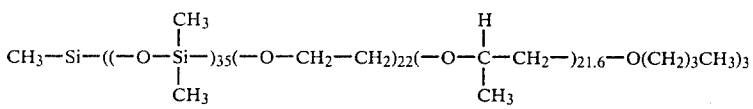

is added. The melt flow rate of this composition is 16.98 g/10 min., while the impact strength is 11.8 ft.lbs./in.

The procedure is repeated except that 0.4 weight percent of the alkoxy (polyalkylene oxide) siloxane additive is added. The melt flow rate of this composition according to this invention is 21.67 g/10 min., while the impact strength is 13.6 ft.lbs./in.

EXAMPLE 2

A second polycarbonate composition is prepared according to the process of Example 1. The melt flow rate is 5.08 g/10 min., the impact strength is 17.86 ft.lbs./in., and the melt viscosity is 6390 poise.

The procedure is repeated except that 0.4 weight percent of the alkoxy (polyalkylene oxide) siloxane of Example 1 is added. The resultant melt flow rate of this composition according to this invention is 9.98 g/10 min., the impact strength is 16.3 ft.lbs./in., and the melt viscosity is 3290 poise.

It can be seen from the data that when the instant alkoxy (polyalkylene oxide) siloxane is added to an aromatic polycarbonate, the resulting polycarbonate composition has reduced melt viscosity as shown directly by the higher melt flow rate while retaining impact strength, indicating no embrittlement, as is common with other additives. These properties are obtained at high temperatures where thermal degradation is likely to be a factor.

It will thus be seen that the objects set forth above among those made apparent from the preceding description are efficiently attained. Obvious variations can be made in light of the detailed disclosure. For example, a carbonate copolymer derived from bisphenol A and tetrabromo bisphenol A can be used. Phenyl diphenylphosphonite can be substituted for the phosphonate. 2% by weight of titanium dioxide can be used as a pigment, and so forth. Since such changes may be made in carrying out the above process, and in the composition set forth without departing from the scope of this invention, it is intended that all matters contained in the above description shall be interpreted as illustrative and not in a limiting sense.

We claim:

1. A plasticized, stabilized, polycarbonate molding composition having a combination of improved melt viscosity and high impact strength comprising in admixture (a) an aromatic carbonate homopolymer of bisphenol-A and (b) at least about 0.3 parts of a siloxyoxyalkylene block copolymer wherein each copolymer contains a siloxane polymer and at least one oxyalkylene polymer in combination, the siloxane polymer being composed of at least one trifunctional silicon atom, bonded to three oxygen atoms and a single monovalent hydrocarbon radical, and joined to at least three difunctional silicon atoms through oxysilicon bonds, each of said difunctional silicon atoms having two monovalent hydrocarbon radicals bonded thereto and the oxyalkylene polymer being composed of at least five oxyalkylene groups bonded to each other by oxycarbon bonds and bonded at one end to the siloxane polymer through a carbon-oxy-silicon bond and bonded at the other end to a monoether radical.

2. A molding composition as defined in claim 1 wherein component (b) is present in an amount of from about 0.3 to about 5.0 parts per one hundred parts of aromatic carbonate polymer (a).

3. A molding composition as defined in claim 2 wherein component (b) is present in an amount of from about 0.4 to about 1.0 parts per one hundred parts of aromatic carbonate polymer (a).

4. A molding composition as defined in claim 1 which also includes (c) a stabilizing amount of an organophosphite or organophosphonite of the formula:

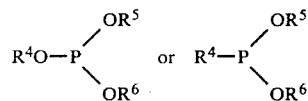

wherein $R^4$, $R^5$ and $R^6$ are independently selected from hydrogen, alkyl, aryl, cycloalkyl, aralkyl and alkylaryl, wherein at leat one such R is other than hydrogen.

5. A molding composition as defined in claim 1 which further includes (d) a stabilizing amount of an epoxy compound selected from the following:

1. Derivatives of epoxy ethane represented by the following formula:

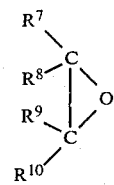

wherein $R^7$, $R^8$, $R^9$ are independently selected from hydrogen, alkyl of 1–24 carbon atoms, aryl of 6–24 carbon atoms, $-CH_2OR^{11}$, $-CH_2OCOR^{11}$, $-CH_2OCOR^{11}X$, $-COOCH_2X$, $-CH_2OR^{1-}$ 2OCH$_2$X wherein R$^{11}$ is selected from alkyl of 1-24 carbon atoms or aryl of 6 to 24 carbon atoms and wherein R$^{12}$ is alkylene of 1-24 carbon atoms and X is an oxirane ring;

II. Derivatives of epoxy cyclohexane represented by the following formula:

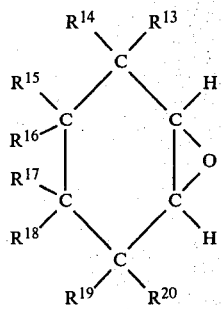

wherein R$^{13}$ through R$^{20}$ are independently selected from hydrogen, alkyl of 1-24 carbon atoms, —COOR$^{21}$, —OCOR$^{21}$, —COOR$^{22}$X, —OCOR$^2$-2—COOX wherein R$^{21}$ is alkyl of 1-24 carbon atoms and R$^{22}$ is alkylene of 1-24 carbon atoms and X is an oxirane ring.

6. A molding composition as defined in claim 1 which further includes a pigment.

7. A molding composition as defined in claim 6 wherein said pigment is titanium dioxide.

8. A molding composition as defined in claim 1 wherein component (b) is of the formula:

(R) (SiO$_3$)$_x$(R$_2^1$ SiO)$_y$((C$_n$H$_{2n}$O)$_z$R$^2$)$_a$(R$^3$)$_{3x-a}$ wherein R is a hydrocarbon radical having the valence of x, R$^1$ and R$^2$ are monovalent hydrocarbon radicals, R$^3$ is a member of the group consisting of alkyl radicals and R$_3$Si— radicals, x is an integer having a value of at least 1, y is an integer having a value of at least 3, n is an integer having a value of 2 to 4, a is an integer having a value of at least 1 and not greater than 3x, and z is an integer having a value of at least 5, and mixtures thereof.

9. A molding composition as defined in claim 8 wherein component (b) is of the formula:

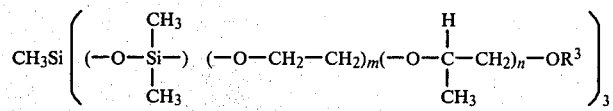

wherein p+q+r=y, and y has a minimum value of 3.

10. A molding composition as defined in claim 9 wherein component (b) is of the formula:

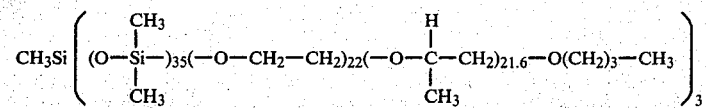

wherein R$^3$ is C$_1$-C$_6$ alkyl, l is 5 to 50, m is 10 to 30, and n is 0 to 35.

11. A molding composition as defined in claim 9 wherein component (b) is of the formula:

CH$_3$Si $\left( \text{(O—Si(CH}_3\text{)}_2\text{—)}_{35}\text{(—O—CH}_2\text{—CH}_2\text{)}_{22}\text{(—O—C(H)(CH}_3\text{)—CH}_2\text{)}_{21.6}\text{—O(CH}_2\text{)}_3\text{—CH}_3 \right)_3$ 12. A molding composition as defined in claim 11 which also includes a stabilizing amount of an organophosphite or organophosphite of the formula:

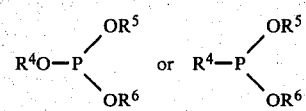

wherein R$^4$, R$^5$ and R$^6$ are independently selected from hydrogen, alkyl, aryl, cycloalkyl, aralkyl and alkylaryl, wherein at least one such R is other than hydrogen.

* * * * *